United States Patent Office 3,526,923
Patented Sept. 8, 1970

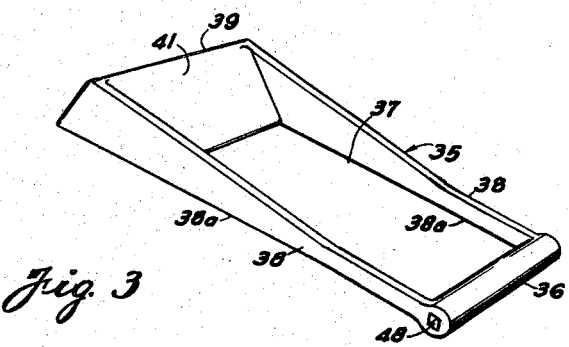
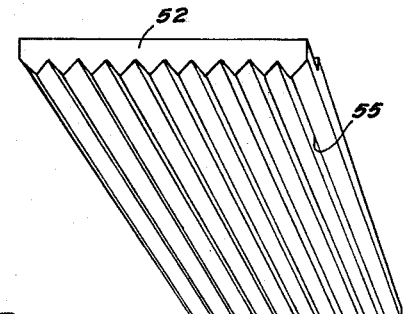
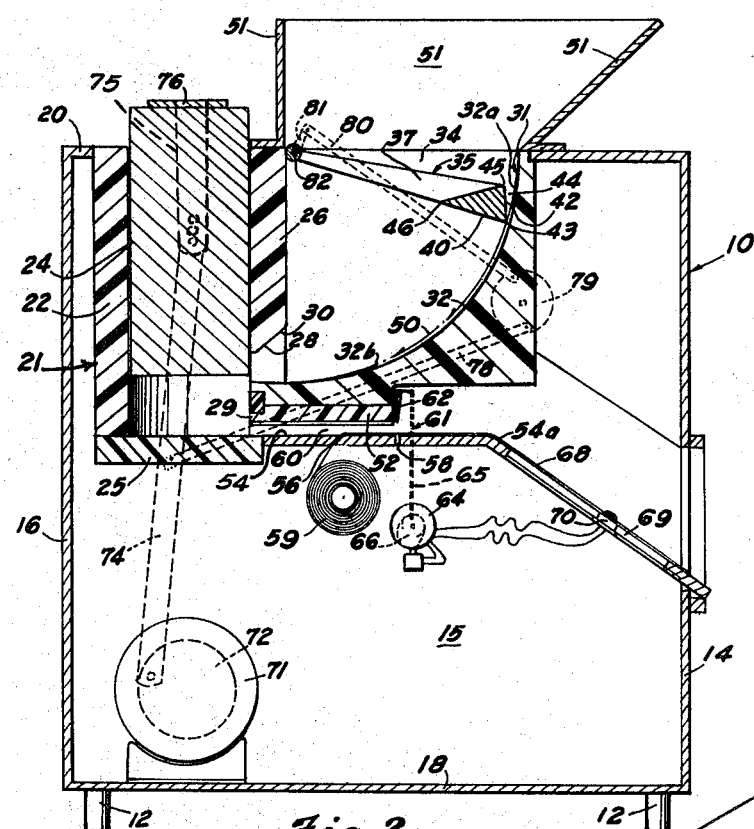
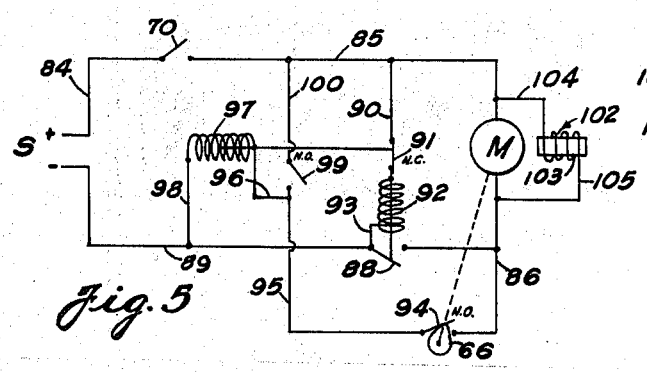
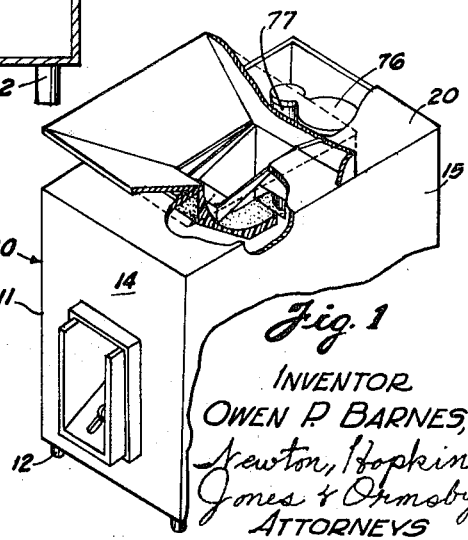

3,526,923
MEAT MOLDING APPARATUS
Owen P. Barnes, Jr., P.O. Box 159,
Warner Robins, Ga. 31093
Filed Jan. 17, 1967, Ser. No. 609,814
Int. Cl. A22c 7/00
U.S. Cl. 17—32                                    9 Claims

ABSTRACT OF THE DISCLOSURE

Meat molding method and apparatus comprising a hopper for the receipt of moldable meat, an arcuate feed conduit disposed below the hopper, a compression chamber positioned adjacent said feed conduit and defining an opening adjacent said feed conduit, a feed paddle positioned in said feed chamber for oscillating movement, an extruding conduit communicating with the lower portion of the compression chamber, paper supply means for applying a strip of paper to the meat extruded from the extruding conduit and cutting means for cutting the meat and paper in predetermined lengths.

BACKGROUND OF THE INVENTION

In the manufacture of minute steaks, cube steaks or similar molded forms of meat, the meat is usually received in mass or agglomerate form and shaped by mechanical means into a rather thin, pulverized form. The treatment of the meat is such that it is generally pulverized so as to break up the tough portions of the meat and separate the gristle from the lean meat, and the formation of the meat in thin strips is so that the meat can be rapidly cooked. While various apparatus have been constructed to mechanically process meat into the pulverized, thin strips, the present day machines usually fail to form a strip of meat of consistent thickness and shape, and application of paper to the meat for protective purposes is usually performed in a step separate from the molding process.

SUMMARY OF THE INVENTION

Thi sinvention comprises a meat molding method and apparatus wherein meat is fed from a hopper to an arcuate feed conduit, a feed paddle located in the arcuate feed conduit urges the meat toward the opening in the side of a compression chamber, a piston within the compression chamber compresses the meat therein and forces the meat through an extruding conduit, the meat is forced over the surface of a strip of paper leading from a roll of paper to carry the strip of paper through the extruding conduit, and a cutting means cuts through the meat and its strip of paper at predetermined intervals so that a strip of meat is formed of a width and thickness corresponding to the width and thickness of the extruding conduit and of a length as determined by the cutting means. The arcuate feed conduit curves from the hopper toward the inlet opening of the compression chamber, and the feed paddle oscillates within the arcuate feed conduit, about a point adjacent the center of the radius of curvature of the arcuate feed conduit. The feed paddle is constructed and arranged so that meat is introduced through the inlet aperture into the compression chamber under a substantially constant pressure, and the piston of the compression chamber reciprocates to close, or to partially close the inlet opening of the compression chamber to create the pressure for the extruding process.

Accordingly, it is an object of this invention to provide apparatus for forming strips of meat, or like substances, wherein the strips are of a constant width, thickness and length.

It is another object of this invention to provide apparatus for forming strips of meat and applying paper, or similar protective substance, to one surface of the meat, of a length and width corresponding to the length and width of the strip of meat.

Another object of this invention is to provide apparatus for forming strips of meat having one smooth surface and one corrugated surface.

Another object of this invention is to provide a method of forming strips of meat of consistent shape and density and applying a protective sheet of paper to one surface of the meat.

Another object of this invention is to provide a method of forming strips of meat from an agglomerate, wherein the meat has one smooth surface and one corrugated surface, and paper is applied to the smooth surface.

Another object of this invention is to provide apparatus for forming strips of meat from a mass of meat, wherein a large quantity of meat can be fed at a single feeding to the apparatus, and the apparatus will function with no further attention.

Another object of this invention is to provide apparatus for molding strips of meat from the mass of meat, wherein the apparatus is easy to clean, easily operated, does not waste meat, and does not allow the meat processed therein to become lodged in inaccessible portions of the apparatus to spoil.

Another object of this invention is to provide a feed paddle for a meat molding apparatus wherein the meat processed through the apparatus can be received through the center portion of the paddle and compressed by the paddle.

Other objects, features and advantages of the present invention will become apparent upon reading the following specification when taken in conjunction with the accompanying drawing.

BRIEF DESCRIPTION OF THE DRAWING

FIG. 1 is a partial perspective view of the meat molding apparatus.

FIG. 2 is a schematic view of a cross section taken through the meat molding apparatus.

FIG. 3 is a perspective view of the feed paddle of the meat molding apparatus.

FIG. 4 is a perspective view of the mold plate which forms the upper surface of the extruding conduit of the meat molding apparatus.

FIG. 5 is a schematic electrical diagram of the circuitry utilized to actuate the cutting means of the meat molding apparatus.

DESCRIPTION OF THE EMBODIMENT

Referring now more particularly to the drawing, in which like numerals indicate like parts throughout the several views, FIG. 1, shows the meat molding apparatus 10 which includes an exterior housing 11. Housing 11 may be supported from a table surface, or by legs 12 from a floor or other support surface. Housing 11 includes front wall 14, side walls 15 and rear wall 16. A bottom wall 18 joins the front, side and rear walls together. Top wall 20 joins the upper edges of front wall 11, rear wall 16 and side walls 15.

Compression chamber 21 is positioned at the rear of housing 11 and includes a cylinder 22 and piston 24 reciprocally received in the cylinder. Cylinder 22 is closed at its bottom end by bottom wall 25, and piston 24 is reciprocal through the upper, open end of cylinder 22. Cylinder 22 is generally circular in internal cross sectional configuration, and generally rectangular in outside cross sectional configuration. Front wall 26 of cylinder 22 defines an inlet aperture 28 and an extruding aperture 29.

Inlet aperture 28 is of a width substantially equal to the width of the interior portion of cylinder 22 while the upper surface 30 of the inlet aperture 28 is tapered so that it extends in a downward direction toward cylinder 22.

An arcuate feed conduit 31 is positioned beside compression chamber 21, within housing 11. Feed conduit 31 is defined by a concave wall 32, two sidewalls 34 and the front wall 26 of cylinder 22. The concave wall 32 defines an arc of approximately 90 degrees and extends from a vertical direction near its upper portion 32a to a horizontal direction 32b adjacent cylinder inlet aperture 28. The inside surfaces of side walls 34 are spaced apart a distance equal to the width of cylinder 22 and are attached to the sides of cylinder 22. Thus, cylinder 22 and feed conduit 31 are rigidly connected to each other.

Feed paddle 35 is connected to side walls 34 adjacent front wall 26 of cylinder 22 so that it oscillates in the arcuate feed conduit 31. Feed paddle 35 includes a base portion 36, support arms 38, and compression blade 39. Support arms 38 extend from each end of base portion 36 to each end of compression blade 39. Compression blade 39 includes a lower or compression surface 40, upper or feed surface 41 and outer or scraping surface 42. Compression surface 40 is coextensive with the lower or inner edges 38a of support arms 38. Outer or scraping surface 42 is generally flat in configuration and extends back from the outer edge 43 of compression surface 40, toward base portion 36 of the feed paddle, thereby creating a space 44 between the outer or scraping surface 42 of the feed paddle compression blade 39 and concave wall 32 of the arcuate feed conduit 31. Upper or feed surface 41 of the compression blade 39 extends from the upper edge 45 of outer or scraping surface 42 back toward the lower edges 38a of support arms 38 to define an inner edge 46 with lower or compression surface 40. Thus, compression blade 39 is generally triangular in configuration, having its lower or compression surface 40 coextensive with the lower or inner edges 38a of support arms 38 of the feed paddle 35, and defines with base portion 36 and support arms 38 a central opening or aperture 37. Base portion 36 is apertured at 48 for mounting on an oscillating shaft.

The concave wall 32 of arcuate feed conduit 31 has a shorter radius of curvature than the distance between the aperture 48 of the base portion 36 of the feed paddle and the outer edge 43 of the compression blade 39. Thus, when feed paddle 35 oscillates in arcuate feed conduit 31, its outer edge 43 describes the arc indicated by the dotted lines 50, thereby tending to intersect the concave surface 32 near its upper and inner ends 32a and 32b. As feed paddle 35 moves past the center portion of the concave surface 32, its outer edge 43 and outer or scraping surface 42 is displaced a small distance away from concave surface 32.

A feedhopper 51 is attached to housing 11, adjacent feed conduit 31. Hopper 51 is funnel shaped, and tends to guide any substance placed therein toward arcuate feed conduit 31.

Extruding aperture 29 of cylinder 22 is located below inlet aperture 28 and is defined between bottom wall 25 and inner wall 26 of cylinder 22. Mold plate 52 projects into the upper portion of extruding aperture 29 and extends laterally thereof, and stationary slide plate 54 is coextensive with the bottom surface of extruding aperture 29. As is best shown in FIG. 4, mold plate 52 is generally rectangular in length and width and defines a corrugated bottom surface 55. Slide plate 54 defines an angled paper supply aperture 56 and a cutting blade aperture 58. A roll of paper 59 is rotatably mounted between the side walls 15 within the lower portion of housing 11, and the free end of the paper is fed through aperture 56, into extruding conduit 60 defined between mold plate 52 and slide plate 54.

Cutting means 61 is positioned so as to cooperate with slide plate 54. Cutting means 61 comprises a cutting blade 62 positioned adjacent mold plate 52, motor 64 and connecting arms 65. Cutting blade 62 extends toward cutting blade aperture 58 of slide plate 54, and connecting arm 65 connects cutting blade 62 to the flywheel 66 of motor 64. With this arrangement, cutting blade 62 will reciprocate across the extruding conduit, into cutting blade aperture 58 of slide plate 54 upon rotation of the flywheel 66 by motor 64.

Slide plate 54 extends outwardly, away from extruding aperture 29 of cylinder 22, and then in a downward direction at 54a, and is joined to the front wall 14. The downwardly inclined portion 54a of slide plate 54 comprises a slide surface 68. Also, downwardly extending portion 54a of slide plate 54 defines a slot 69 extending longitudinally thereof. A switch 70 extends through slot 69 and above slide surface 68. Switch 70 is connected to motor 64 as indicated in FIG. 5.

Drive motor 71 is connected to bottom wall 18 of housing 11 and rotates flywheel 72. Connecting arm 74 is connected at one of its ends to flywheel 72, and at the other of its ends to extension arm 75. Extension arm 75 is received in and projects through slide block 77 and is connected at its upper end to piston support 76. Piston support 76 is generally flat in configuration and connected to the top surface of piston 24. Piston support 76 extends laterally from the top surface of piston 24, and the connection made between piston 24, piston support 76 and extension arm 75 is rigid, so that extension arm 75 and piston 24 move in unison with each other.

Link arm 78 is connected at one of its ends to the approximate midpoint of connecting arm 75, and at its other end to oscillating connector 79. Secondary link arm 80 is connected at one of its ends to oscillating connector 79 and at its other end to toggle arm 81. Toggle arm 81 is connected to a non-circular shaft 82 extending through aperture 48 of base portion 36 of feed paddle 35. With this construction, rotation of flywheel 72 by motor 71 causes reciprocation of piston 24 in cylinder 22 by means of connecting arm 74, extension arm 75 and piston support 76. Also, the movement of the midportion of connection arm 74 causes corresponding movement to link arm 78, which in turn oscillates the oscillating connector 79, which in turn imparts a corresponding movement to secondary link arm 80 and toggle arm 81. These combined movements function to cause feed paddle 35 to oscillate back and forth in arcuate feed conduit 31. It should be noted that feed paddle 35 moves in an inward or downward direction as piston 24 moves in an upward or outward direction, and that feed paddle 35 moves in an upward or outward direction, while piston 24 moves in an inward or downward direction.

While motor 71 is usually continuously operated so that piston 24 and feed paddle 35 oscillate continually, cutting means 61 is operated only when meat has been extruded through extruding conduit 60. As is best shown in FIG. 5, motor 64 is connected to the source S of electricity through electrical conductor 84, switch 70, conductor 85, conductor 86, switch 88, and conductor 89. Switch 88, which is a relay switch, is energized by means of conductor 90, normally closed switch 91, coil 92 and conductor 93. When switch 70 is closed, a circuit is made through conductors 84, 85, 90, normally closed switch 91, coil 92, conductor 93, and conductor 89, thereby closing switch 88 and energizing motor 64. When motor 64 is energized, flywheel 66 is rotated, as previously described. Flywheel 66 includes a cam surface that functions to open and close switch 94. Thus, when motor 64 is energized, switch 94 is closed and an electrical circuit is made through conductors 86, switch 94, conductors 95 and 96, coil 97, and conductor 98. Coil 97 is part of a relay operatively associated with normally open switch 99 and normally closed switch 91. Energization of coil 97 causes normally opened switch 99 to close and normally closed switch 91 to open. This causes a circuit to be made through conductors 85 and 100, normally opened switch 99, conductor 96, coil 97, and conductor 98.

Motor 64 includes braking means 102 so that it is stopped, virtually instantaneously, upon the opening of its circuit. Braking means 102 includes solenoid 103 which normally engages the motor shaft. When motor 64 is energized, an auxiliary circuit is made through conductors 104, solenoid 103, and conductor 105, thereby withdrawing the brake from the shaft of the motor and allowing the motor 64 to rotate. When the circuit to motor 64 is opened, solenoid 102 is allowed to engage the motor shaft thereby stopping the rotation of the motor.

OPERATION

When it is desired to mold meat or other agglomerate substances into strips, hopper 51 is filled with the meat and drive motor 71 energized in the conventional manner. Energizing the drive motor 71 causes flywheel 72 to rotate, and the offset connection of connecting arm 74 with flywheel 72 causes oscillation of connecting arm 74 to drive piston 24 within its cylinder 22. Feed paddle 35 is caused to reciprocate in arcuate feed conduit 31 by means of link arm 78 being connected to the midpoint of connecting arm 74 and oscillating connector 79, secondary link arm 80 being connected to oscillating connector 79 and toggle arm 81, and toggle arm 81 being connected to the base portion 36 of feed paddle 35. The construction is such that when piston 24 moves in an upward direction, feed paddle 35 moves in an inward or downward direction, and when the piston moves in a downward direction, feed paddle 35 moves in an upward or outward direction. Since feed paddle 35 defines an aperture 37 between its compression blade 39, support arms 38 and base portion 36, any meat located in hopper 51 above feed paddle 35 will be free to fall through aperture 37 into arcuate feed conduit 31. When feed paddle 35 moves in a downward or inward direction, the meat located in arcuate feed conduit 31 is urged toward the inlet opening 28 of the compression chamber 21 by the lower or compression surface 40 of feed paddle 35. When feed paddle 35 has moved to its innermost position, adjacent inlet conduit 28, piston 24 will have been moved to its top dead center position. As flywheel 72 continues in its rotation, piston 24 will move downward in cylinder 22 to compress the meat urged through inlet aperture 28, as feed paddle 35 is moved in an outward, upward direction. As feed paddle 35 moves toward inlet conduit 28, the meat in hopper 51 above feed paddle 35 will tend to follow the movement of feed paddle 35. Thus, there will be a volume of meat present in arcuate feed conduit 31 as feed paddle 35 begins its movement away from inlet opening 28. As feed paddle 35 moves away from inlet opening 28, the meat present in arcuate feed conduit 31 will tend to topple through the aperture 37 of feed paddle 35, over the sloped or tapered upper feed surface 41 of the compression blade 39. Thus, a new supply of meat is fed to arcuate feed conduit 31 during the upward or outward stroke of feed paddle 35.

As feed paddle 35 moves toward inlet aperture 28, if the amount of meat present in feed conduit 31 between compression blade 39 and inlet aperture 28 is excessive, the excessive meat will bulge over the inner edge 46 of compression blade 39 so that the movement of feed paddle 35 will not bind. Moreover, since the outer edge 43 of compression blade 39 is displaced a small amount from concave wall 32 during the middle of its stroke, excess meat may pass between compression blade 39 and concave surface 32.

If any meat being processed through the apparatus has been bypassed around the outer edge 43 of compression blade 39 as it moved toward inlet opening 28, and becomes adhered to concave wall 32, the meat adhering to concave wall 32 will be wedged between the outer or scraping surface 42 of compression blade 39 and concave surface 32 as feed paddle 35 moves away from inlet opening 28. This functions to create a dam of meat between compression blade 39 and concave surface 32 so that the meat will be scraped or squeezed from concave surface 32 with a squeegee motion. As feed paddle 35 moves up concave surface 32, the amount of meat accumulated in space 44 between concave surface 32 and compression blade 39 increases so that it becomes a considerable mass of meat. When feed paddle 35 again begins its downward movement, the mass of meat scraped from concave surface 32 tends to move by means of its own weight back into arcuate feed conduit 31, and by means of other meat tumbling in from hopper 51. Because of the angle of upper surface 41 of compression blade 39, any meat tumbling into the arcuate feed conduit in this manner will normally tend to fall toward the aperture 37 of feed paddle 35. Thus, any meat adhering to the concave wall 32 will not be allowed to remain.

Because of the tapered portion 30 of inlet aperture 28, the meat urged by compression blade 39 of feed paddle 35 toward aperture 28 will tend to be channeled into compression chamber 21. The shape of inlet aperture 28 and the manner in which feed paddle 35 moves within feed conduit 31 is such that a predetermined amount of precompression of the meat is attained prior to the introduction thereof into cylinder 22. The unique bypass features of feed paddle 35 are such as to prevent overcompression of meat as it passes through feed conduit 31.

When piston 24 moves in a downward direction, it progressively closes off inlet aperture 28 to build up the pressure within cylinder 22. Since the bottom dead center position of the stroke of piston 24 may be varied by connecting the connecting arm 74 to various ones of the apertures of extension arm 75, inlet aperture 28 may be completely closed or only partially closed by piston 24.

The increasing pressure of the meat within cylinder 22 causes the meat to be extruded through extruding aperture 29 and passed through extruding conduit 60. Because of the corrugated bottom surface 55 of the mold plate 52, the meat is extruded with its upper surface having a corrugated configuration mating that of mold plate 52. Since slide plate 54 presents a substantially flat upper surface, the bottom surface of the meat extruded through extruding conduit 60 is flat. As the meat travels through extruding conduit 60, it passes paper supply aperture 56, whereupon the meat engages the free end of the paper extending from the roll of paper 59. The friction between the meat and paper is enough to cause the paper to be moved with the meat as it further progresses through extruding conduit 60. Since the paper extends from paper supply 59, more paper is progressively moved through paper supply aperture to continuously receive meat thereon. The angle of paper supply aperture 56 precludes meat from being extruded therethrough.

As the meat and its paper move over slide plate 54, it reaches the downwardly sloped portion 54a of slide plate 54 and begins to slide over slide surface 68. As the leading edge of the meat and paper reaches switch 70 located in slot 69 of downwardly sloped portion 54a of slide plate 54, switch 70 is closed.

Referring now to FIG. 5, as switch 70 is closed, a circuit is made through conductor 84, switch 70, conductor 85, conductor 90, normally closed switch 91, coil 92, conductor 93 and conductor 89. This causes relay switch 88 to move to its closed position, thereby creating a circuit between conductor 85, motor 64, conductor 86, relay switch 88 and conductor 89. Also, a circuit is made through conductor 104, coil 103, and conductor 105 to move braking means 102 away from motor 64 and allow motor 64 to operate. Operation of motor 64 causes rotational movement of flywheel 66 which is connected to cutting blade 62. Cutting blade 62 is caused to reciprocate and cut the strip of meat and paper exuding from extruding conduit 60. Movement of flywheel 66 allows switch 94 to move to its closed position, thereupon making a circuit from motor 64 through conductor 86, switch 94, conductor 95, conductor 96, coil 97, conductor 98, and conductor 89. This causes normally opened switch 99 to move to its closed position and normally closed switch 91 to move to its open position. Thus, relay switch 88 is de-energized, to break the circuit made through motor 64, conductor 86, switch 88, and conductor 89; however, inasmuch as a connection is made from motor 64 through switch 94, motor 64 remains energized. As motor 64 continues to operate and rotate flywheel 66, flywheel 66 eventually opens switch 94, after one complete revolution, thus breaking the circuit made from motor 64, conductor 86, switch 94, conductor 95, conductor 96, coil 97, conductor 98, and conductor 89. While the opening of switch 94 breaks the circuit made from motor 74 to coil 97, a holding circuit was created by the closing of normally opened switch 99, through conductor 85, conductor 100, normally opened switch 99, conductor 96, coil 97, and conductor 98. Thus, normally opened switch 99 remains in a closed position and normally closed switch 91 remains in an open position.

After the strip of meat and paper have been cut by cutting blade 62, the meat and paper will tend to move down slide surface 68 by means of its own gravity. After the meat and paper have moved off slide surface 68, switch 70 will be opened until another strip of meat and paper passes over slide surface 68. The opening of switch 70 breaks the circuit made through conductor 85, conductor 100, normally opened switch 99, conductor 96, coil 97 and conductor 98. This causes normally closed switch 99 to return to its open position, and normally closed switch 91 to return to its closed position so that the circuitry is ready for the receipt of another strip of meat and paper. When switch 70 is closed again, motor 64 will be energized again, as previously described, to cycle cutting blade 62.

Switch 70 is adjustably mounted in slot 69, so that it may be moved along the entire length of slot 69. Thus, the length of the strip of meat and paper extruded from extruding conduit 60 may be adjusted by the movement of switch 70 within its slot 69.

Mold plate 52 may be replaced by a mold plate of different thickness so that the thickness of the strip of meat extruded through extruding aperture 29 may also be adjusted. If mold plate 52 is thick, the space remaining in extruding conduit is thin so that a thin strip of meat is extruded; whereas if mold plate 52 is thin, a larger extruding aperture 29 and extruding conduit will be provided to form a thicker strip of meat.

The corrugations of mold plate 52 impart a corresponding shape to the upper surface of the meat extruded through the extruding conduit 60. The meat formed in this manner appears to be of a certain thickness; however, the series of indentations or corrugations formed therein by the mold plate 52 are such as to have the effect of allowing heat to quickly penetrate the meat during the cooking process, thus requiring a smaller amount of heat.

Feed paddle 35 and piston 24 cooperate with each other to form a strip of meat of consistent density and the extruding aperture 29 and extruding conduit 60 function to provide a constant thickness and width to the strip of meat. When switch 70 is allowed to remain in a stationary position in slot 69, the lengths of meat extruded from the extruding conduit 60 are constant. With this construction, if meats of generally the same consistency are fed through hopper 51, the strips extracted from the apparatus will be virtually identical in size, weight, and density, thereby simplifying the packaging procedure and weighing and pricing process.

The simple construction of the invention is such that cleaning of the various components may be expediently performed. Furthermore, the construction is such that the meat being processed through the invention does not tend to pass into any crevices or corners of the apparatus where it may be inadvertently stored and allowed to spoil.

It will be obvious to those skilled in the art that many variations may be made in the embodiments chosen for the purpose of illustrating the present invention.

What is claimed is:
1. Meat molding means comprising compression means including an inlet for receiving meat having a feed conduit communicating with said inlet and means within said conduit for urging meat toward said inlet, said conduit including at least one concave surface and means constructed and arranged to oscillate over said concave surface to urge meat toward said inlet, said oscillating means comprising a feed paddle including a base portion with ends, a compression blade and support arms extending between the ends of said base portion and said compression blade, and means connected to said base portion for oscillating said compression blade over said concave surface.

2. The invention of claim 1 wherein said compression blade is triangular in cross-section.

3. Meat molding apparatus comprising compression means including an inlet for receiving meat, a feed conduit defining a concave bottom surface extending from a generally vertical position to a generally horizontal position adjacent said inlet and feed means including a compression surface constructed and arranged to sweep over said concave surface, wherein said concave bottom surface defines a radius of curvature and said compression surface is pivotal about a pivot point adjacent the center of radius of curvature.

4. The invention of claim 3 wherein said feed means comprises a feed paddle defining a central opening and a compression blade, said compression blade being generally triangular in cross-section with one of its sides comprising said compression surface and extending generally radially away from said pivot point, and its side remote from said pivot point extending at an obtuse angle with respect to a radius extending from said pivot point to define with said concave bottom surface a wedge shaped space.

5. Apparatus for molding meat comprising:
   a hopper;
   an arcuate feed conduit positioned below said hopper and comprising a concave surface including a substantially horizontally extending portion and a substantially vertically extending portion;
   feed paddle means positioned within said feed conduit and arranged to oscillate over said concave surface;
   a cylinder defining an inlet opening adjacent the horizontally extending portion of said concave surface of the feed conduit and an outlet opening;
   a piston reciprocally mounted in said cylinder;
   a molding conduit communicating with said outlet opening and defining a paper supply aperture;
   means for supplying paper to said molding conduit through said paper supply aperture;
   cutting means positioned adjacent said molding conduit;
   means for cycling said cutting means;
   and motivating means connected to said piston and said feed paddle.

6. In an apparatus for use in molding meat comprising, in combination:
   (a) a meat feeding chamber mounted on said apparatus for feeding meat to a molding means;
   (b) means on said chamber for defining a meat feeding opening;
   (c) means on said chamber for defining a feeding surface having an edge terminating adjacent said meat feeding opening, said meat feeding surface being detailed to include a sloping surface angularly disposed relative to the feeding axis of said feeding opening;
   (d) a feed paddle means, including a compression surface and an angular disposed return surface;
   (e) means mounting said feed paddle means on said chamber for reciprocating movement along said feeding surface, said mounting means being detailed such that said compression surface is located on said feed paddle means adjacent said feeding opening when moved through a feeding operation and wherein said angularly disposed surface is located on said feed paddle on an opposite side from said compression surface; and (f) means mounted on said apparatus and operatively associated with said feed paddle means for effecting said reciprocating movement of said feed paddle along said feeding surface.

7. In an apparatus for use in molding meat as described in claim 6 further characterized in that said feeding surface is detailed to define a concave surface and wherein said feed paddle is pivotally mounted for pivotal movement about a pivot point located adjacent the center of radius of said concave surface.

8. In an apparatus for use in molding meat as described in claim 6 further characterized in that said apparatus includes means located adjacent said feeding opening for extruding meat in a predetermined form and wherein means are supported on said apparatus and operatively associated with said meat extruding means for applying a sheet of protective material to the meat being extruded therefrom.

9. In an apparatus for use in molding meat as described in claim 8 further characterized in that said apparatus includes cutting means mounted on said apparatus adjacent said meat extruding means and operatively associated therewith for cutting meat extruded therefrom in predetermined lengths.

References Cited

UNITED STATES PATENTS

| | | | |
|---|---|---|---|
| 2,794,405 | 6/1957 | Vogt | 17—32 X |
| 2,981,973 | 5/1961 | Elmore | 17—45 |
| 3,137,029 | 6/1964 | De Zolt | 17—32 |
| 3,203,037 | 8/1965 | Anhanger et al. | 17—32 |
| 3,312,997 | 4/1967 | Merrels | 17—32 |
| 3,319,286 | 5/1967 | Ammons et al. | 17—45 |
| 3,354,846 | 11/1967 | Ferrary et al. | 17—32 X |
| 2,209,824 | 7/1940 | Louisot et al. | 17—32 |
| 2,771,366 | 11/1956 | Shadid | 99—108 |
| 2,795,816 | 6/1957 | Spang et al. | 17—32 |
| 3,416,187 | 12/1968 | Chartier | 17—32 |

LUCIE H. LAUDENSLAGER, Primary Examiner

U.S. Cl. X.R.

107—15